(12) United States Patent
Clark et al.

(10) Patent No.: US 11,149,768 B2
(45) Date of Patent: Oct. 19, 2021

(54) FASTENER ASSEMBLY HAVING A COMPONENT-ISOLATING GROMMET

(71) Applicant: ILLINOIS TOOL WORKS INC., Glenview, IL (US)

(72) Inventors: Chad M. Clark, Stamping Ground, KY (US); Ronald Owens, Lawrenceburg, KY (US); Michael Fullerton, Clarkston, MI (US)

(73) Assignee: Illinois Tool Works Inc., Glenview, IL (US)

( * ) Notice: Subject to any disclaimer, the term of this patent is extended or adjusted under 35 U.S.C. 154(b) by 305 days.

(21) Appl. No.: 16/343,177

(22) PCT Filed: Oct. 6, 2017

(86) PCT No.: PCT/US2017/055486
§ 371 (c)(1),
(2) Date: Apr. 18, 2019

(87) PCT Pub. No.: WO2018/089138
PCT Pub. Date: May 17, 2018

(65) Prior Publication Data
US 2019/0242418 A1    Aug. 8, 2019

Related U.S. Application Data

(60) Provisional application No. 62/419,701, filed on Nov. 9, 2016.

(51) Int. Cl.
*F16B 5/02*    (2006.01)
(52) U.S. Cl.
CPC .......... *F16B 5/0258* (2013.01); *F16B 5/0241* (2013.01); *F16B 5/02* (2013.01)

(58) Field of Classification Search
CPC ........ F16B 5/02; F16B 5/0241; F16B 5/0258; F16B 43/00; F16B 43/001; B60R 16/0215; B60R 16/0222; F16L 5/10; F16L 41/088
(Continued)

(56) References Cited

U.S. PATENT DOCUMENTS 3,895,408 A * 7/1975 Leingang .............. F16B 5/0258
16/2.1
4,522,378 A * 6/1985 Nelson .................. F16B 5/0258
16/2.1
(Continued)

FOREIGN PATENT DOCUMENTS

CN        1036621 A      10/1989
CN      203161739 U       8/2013
(Continued)

OTHER PUBLICATIONS

International Search Report for PCT/US2017/055486, dated Dec. 8, 2017.

*Primary Examiner* — Roberta S Delisle
(74) *Attorney, Agent, or Firm* — Quarles & Brady LLP

(57) ABSTRACT

A fastener assembly is configured to securely couple to a component. The fastener assembly includes a compression-limiting bushing, a fastener coupled to the bushing, and a grommet coupled to the bushing. A clearance gap is defined between one or both of the bushing or the fastener and the grommet. At least a portion of the grommet is configured to move into the clearance gap as the fastener assembly is urged into an opening of the component. The grommet is configured to securely couple to the component.

19 Claims, 11 Drawing Sheets

(58) Field of Classification Search
USPC ..................................... 411/353, 517; 16/2.1
See application file for complete search history.

(56) References Cited

U.S. PATENT DOCUMENTS

| | | | | |
|---|---|---|---|---|
| 4,732,519 A * | 3/1988 | Wagner | ................. | F16B 5/0258 |
| | | | | 403/14 |
| 4,975,008 A * | 12/1990 | Wagner | ................... | F02B 77/00 |
| | | | | 411/337 |
| 5,094,579 A * | 3/1992 | Johnson | ................. | F02B 77/00 |
| | | | | 411/107 |
| 5,782,595 A * | 7/1998 | Schneider | ............... | F16B 5/025 |
| | | | | 411/352 |
| 5,807,052 A * | 9/1998 | Van Boven | ........... | F16B 41/002 |
| | | | | 411/353 |
| 6,059,503 A * | 5/2000 | Johnson | ................ | F16B 41/002 |
| | | | | 411/353 |
| 6,280,132 B1 * | 8/2001 | Szczukowski | ... | F02M 35/10078 |
| | | | | 411/353 |
| 6,354,578 B1 * | 3/2002 | Nakatsukasa | ......... | B60S 1/0444 |
| | | | | 267/141.7 |
| 7,786,629 B2 * | 8/2010 | Fukuda | ................. | B60S 1/0444 |
| | | | | 310/51 |
| 2002/0098058 A1 * | 7/2002 | Caldera | ................... | F16B 43/00 |
| | | | | 411/353 |

FOREIGN PATENT DOCUMENTS

| | | |
|---|---|---|
| CN | 104903599 A | 9/2015 |
| DE | 20023687 U1 | 7/2005 |
| DE | 102010045833 A1 | 4/2011 |

\* cited by examiner

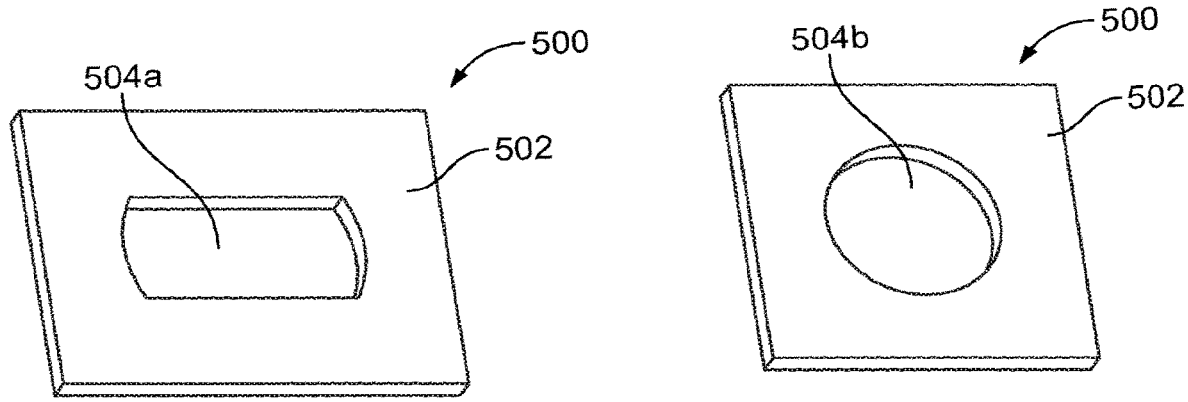
FIG. 10
FIG. 11
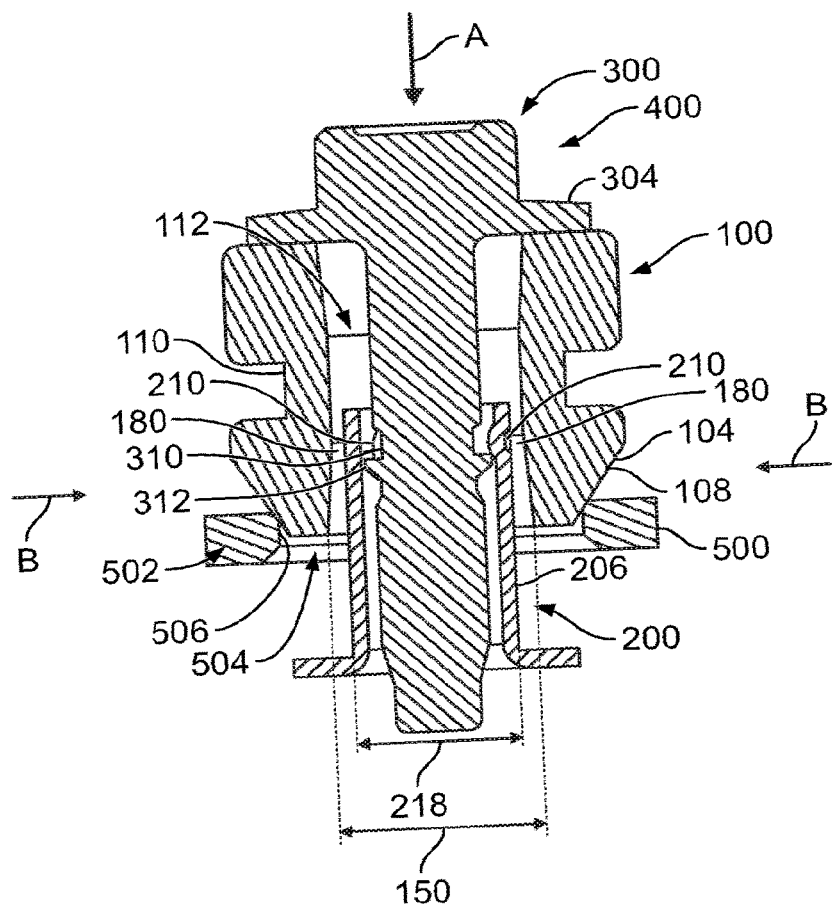
FIG. 12

FASTENER ASSEMBLY HAVING A COMPONENT-ISOLATING GROMMET

RELATED APPLICATIONS

This application represents the United States National Stage of International Application No. PCT/US2017/055486, filed Oct. 6, 2017, which claims priority to benefits from U.S. Provisional Patent Application No. 62/419,701, entitled "Fastener Assembly," filed Nov. 9, 2016, which are hereby incorporated by reference in their entirety.

FIELD OF EMBODIMENTS OF THE DISCLOSURE

Embodiments of the present disclosure generally relate to fastener assemblies, and, more particularly, to fastener assemblies including a component-isolating grommet.

BACKGROUND

Various assemblies include panels, components, or other such objects connected to one another. Automobile assemblies, for example, include various panels and structures connected to other panels or structures, or to an automobile frame. Fasteners are used to secure various components to portions of a vehicle.

Fasteners are used to secure various components together in a variety of applications. One type of fastener assembly includes a bolt positioned within metal bushings. Each metal bushing includes a generally flat flange integrally connected to a hollow column, which is generally perpendicular to the flange. The columns are positioned within a channel or opening formed through a work-piece component that is to be secured to and isolated from another component through the fastener assembly In order to secure a known H-style grommet to a component, the grommet is urged through a hole in the component and then a metal stamping or bushing is shoved into the grommet. This process is difficult and cumbersome, and requires relatively high insertion forces and component strength. That is, the force needed to insert the grommet into the hole of the component and insert the bushing may cause damage to the grommet and/or the component. Indeed, components formed of certain materials, such as carbon fiber, may not be able to withstand the high insertion forces used to insert the grommet into the component, for example.

SUMMARY OF EMBODIMENTS OF THE DISCLOSURE

A need exists for a grommet that may be easily, safely, and securely coupled to a component. Further, a need exists for a simpler process of securing a grommet to a component.

With those needs in mind, certain embodiments of the present disclosure provide a fastener assembly that is configured to securely couple to a component. The fastener assembly includes a compression-limiting bushing, a fastener coupled to the bushing, and a grommet coupled to the bushing. A clearance gap is defined between one or both of the bushing or the fastener and the grommet. At least a portion of the grommet is configured to move into the clearance gap as the fastener assembly is urged into an opening of the component. The grommet is configured to securely couple to the component.

In at least one embodiment, the grommet includes a nose. The portion(s) of the grommet that is configured to be moved into the clearance gap may include the nose. A rim is connected to the nose. An intermediate channel is between the nose and the rim. The intermediate channel is configured to securely retain an edge of the component that defines an opening into which the fastener assembly is configured to be disposed. A central bore passes through the nose, the rim, and the intermediate channel. A portion of the bushing and a portion of the fastener are retained within the central bore. The nose may include a beveled tip. In at least one embodiment, the grommet includes a first nose connected to a second nose. The first and second noses may include recessed spaces.

In at least one embodiment, the bushing includes a flange, a tube extending from the flange, and a central passage formed through the flange and the central tube. A shaft of the fastener may be retained within the central passage.

At least one protuberance may extend from the tube into the central passage. The protuberance(s) is configured to interact with at least a portion of the fastener to limit relative motion between the fastener and the bushing.

The bushing may include one or more retaining protuberances inwardly extending into the central passage from an interior wall of the tube. The retaining protuberance(s) are configured to be retained by at least one indentation formed in a shaft of the fastener.

In at least one embodiment, the fastener includes a head having a radial collar, and a shaft connected to the head. The shaft includes a first segment extending from the head, an inwardly-recessed circumferential indentation formed at an end of the first segment, a radial protuberance radially and outwardly extending proximate to the indentation, a ramp inwardly canting from the ledge, and a second segment having a distal tip.

In at least one embodiment, a tube of the bushing is configured to be inserted and urged into a central bore formed through the grommet. The fastener is configured to be coupled to the bushing after the bushing is coupled to the grommet.

The grommet may be axially constrained between a collar of the fastener and a flange of the bushing.

In at least one embodiment, an outer diameter of a tube that fits within a central bore of the grommet is less than a diameter of the central bore. The clearance gap is defined between an inner wall of the grommet that defines the central bore and an outer surface of the tube.

The grommet may include at least one protuberance extending into the central bore. The protuberance(s) is configured to interact with at least a portion of the bushing to limit relative motion between the bushing and the grommet. For example, a plurality of first protuberances and a plurality of second protuberances may be separated by an annular space. In at least one embodiment, a retention foot of the bushing is configured to be retained within the annular space between the plurality of first protuberances and the plurality of second protuberances in a pre-assembled position. The protuberance(s) may include an inwardly-directed ridge.

BRIEF DESCRIPTION OF SEVERAL VIEWS OF THE DRAWINGS

FIG. 10 illustrates a perspective top view of a component, according to an embodiment of the present disclosure.

FIG. 11 illustrates a perspective top view of a component, according to an embodiment of the present disclosure.

FIG. 12 illustrates an axial cross-sectional view of a fastener assembly initially mated into an opening of a component, according to an embodiment of the present disclosure.

Figure 1:
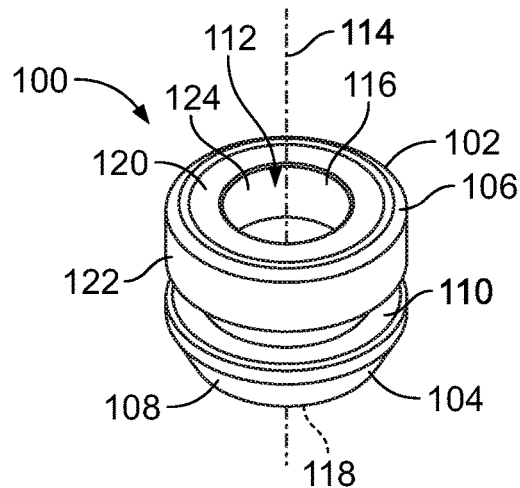
FIG. 1 illustrates a perspective first end view of a grommet, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastener assembly including a captured compression limiter and a molded elastomer member (for example, a grommet) that provides noise, vibration, and/or material isolation on two sides of a component (for example, a portion of an engine cover). The fastener assembly retains a fastener, and a captured grommet that couples to the component. In at least one embodiment, a clearance gap (such as a void area) is formed during insertion for the grommet material to deform into, allowing the fastener assembly to be secured to the component using lower insertion forces (as compared to known H-style grommet fastener assemblies). The grommet may deform by inwardly deflecting, compressing, flattening, or otherwise moving into the clearance gap as a portion of the grommet is urged into an opening of the component.

Embodiments of the present disclosure provide an improved fastener assembly as compared to previous designs, in that previous "H style" grommets were shoved through a hole in the component and then a metal stamping or bushing was shoved into the grommet, which often proves difficult and cumbersome, and generally requires high insertion forces and component strength. Embodiments of the present disclosure provide a fastener assembly configured to be inserted using reduced force. Embodiments of the present disclosure may be used with applications that may be unable to withstand high insertion forces, such as carbon fiber components.

The fastener assembly provides the added feature of noise, vibration, and/or material isolation between the component (for example, a portion of an engine cover) and the fastener assembly. The fastener assembly is configured for low insertion force of a captured fastener assembly/limiter with grommet by allowing a relief area for the grommet material to inwardly deform during installation. In at least one embodiment, the fastener assembly is configured for additional retraction, allowing for a shorter limiter and grommet to be used, thereby reducing cost and material.

Embodiments of the present disclosure provide a robust fastening system and method that provide greater clamping forces as compared to previous ball stud designs, which are susceptible to unfastening during crash tests, for example. A threaded joint fastening method according to embodiments of the present disclosure can be designed to be torqued to a desired clamp load amount.

Embodiments of the present disclosure provide a cost savings over traditional two-piece snap together designs that require 2 limiters, 2 grommets, and a component to retain the two sides together as a second grommet and additional retention component are not required.

Embodiments of the present disclosure provide improvement over previous design proposals due to ease of installation at the tier level supplier and engine assembly OEM customer. Previous designs do not capture the fastener or fastening nut into the engine component before being shipped to the engine assembly plant. Instead, the previous designs typically require an individual to manually attach components to the cover or plastic component, then attach to the engine manually.

FIG. 1 illustrates a perspective first end view of a grommet 100, according to an embodiment of the present disclosure. Depending on the orientation of the grommet 100, the first end may be a top end, a bottom end, a lateral end, or the like. The grommet 100 includes a main body 102, which may be formed of a flexible and resilient material. For example, the grommet 100 may be formed of an elastomeric material, such as rubber.

The main body 102 of the grommet 100 includes a nose 104 connected to a rim 106. The nose 104 may include a beveled tip 108. An intermediate annular channel 110 is formed between the nose 104 and the rim 106. A central passage or bore 112 is formed through the main body 102. The central bore 112 extends through the nose 104 and the rim 106 and may be coaxial with a central longitudinal axis 114 of the grommet 100. The central bore 112 includes a first opening 116 formed through the rim 106 and a second opening 118 formed through the nose 104. The rim 106 includes an annular planar surface 120 surrounding the first opening 116, an outer annular wall 122, and A circumferential inner wall 124 that defines a portion of the central bore 112.

Figure 2:
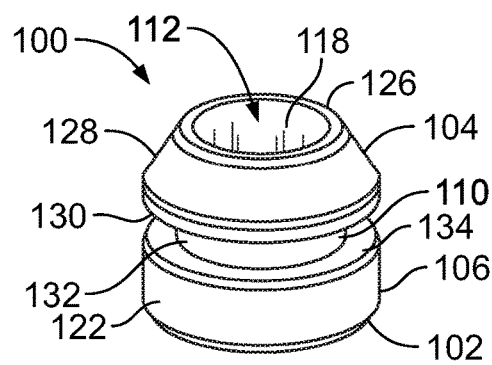
FIG. 2 illustrates a perspective second end view of a grommet, according to an embodiment of the present disclosure.

FIG. 2 illustrates a perspective second end view of the grommet 100. The nose 104 includes an exposed lip 126 that connects to an outer annular beveled wall 128 that outwardly expands from the lip 126 to an annular ledge 130 that defines a portion of the channel 110. The channel 110 is defined by the ledge 130 of the nose 104, a reduced diameter outer wall 132, and an annular ledge 134 of the rim 106 opposite from the ledge 130 of the nose 104.

Figure 3:
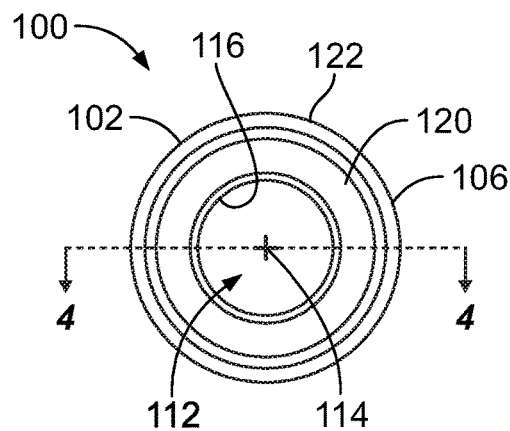
FIG. 3 illustrates a first end view of a grommet, according to an embodiment of the present disclosure.

FIG. 3 illustrates a first end view of the grommet 100. As shown, the central bore 112 passes through the length of the grommet 100. As noted, the central bore 112 may be coaxial with the central longitudinal axis 114 of the grommet 100.

Figure 4:
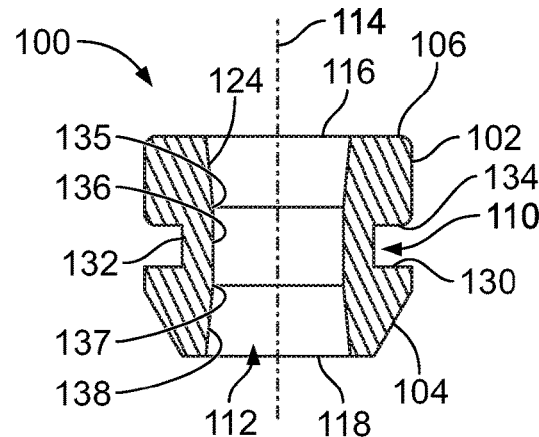
FIG. 4 illustrates an axial cross-sectional view of a grommet through line 4-4 of FIG. 3, according to an embodiment of the present disclosure.

FIG. 4 illustrates an axial cross-sectional view of the grommet 100 through line 4-4 of FIG. 3. The circumferential inner wall 124 of the rim 106 may inwardly angle (that is, reduce in diameter) from the opening 116 towards a first end 135 of a cylindrical intermediate wall 136 proximate to the channel 110. A circumferential inner wall 138 of the nose 104 may outwardly angle (that is, expand in diameter) from a second end 137 of the intermediate wall 136 to the opening 118. The central bore 112 is defined by interior surfaces of the circumferential inner wall 124, the intermediate wall 124, and the circumferential inner wall 138. Optionally, the circumferential inner wall 124 and the circumferential inner wall 138 may be cylindrical and not inwardly or outwardly angle.

Figure 5:
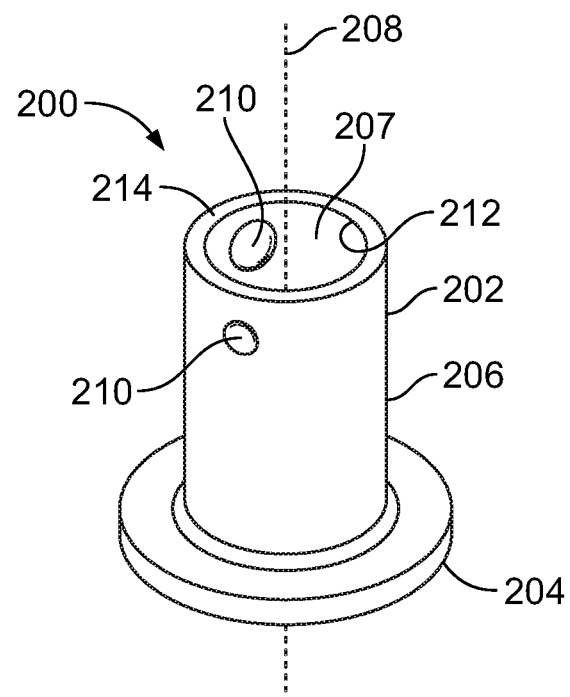
FIG. 5 illustrates a perspective view of a compression-limiting bushing, according to an embodiment of the present disclosure.

FIG. 5 illustrates a perspective view of a compression-limiting bushing 200 (or compression limiter), according to an embodiment of the present disclosure. The bushing 200 includes a main body 202, which may be formed of a metal, plastic, and/or the like. The bushing 200 includes a circumferential flange 204 and a central tube 206 extending from the flange 204. A central passage 207 is formed through the bushing 200, and may be coaxial with a central longitudinal axis 208 of the bushing 200. One or more retaining protuberances 210 inwardly extend into the central passage 207 from an interior wall 212 of the tube 206. The protuberances 210 may be semispherical nubs, studs, or the like. As shown, the protuberances 210 may be located proximate to an end 214 of the tube 206 that is distally located from the flange 204.

Figure 6:
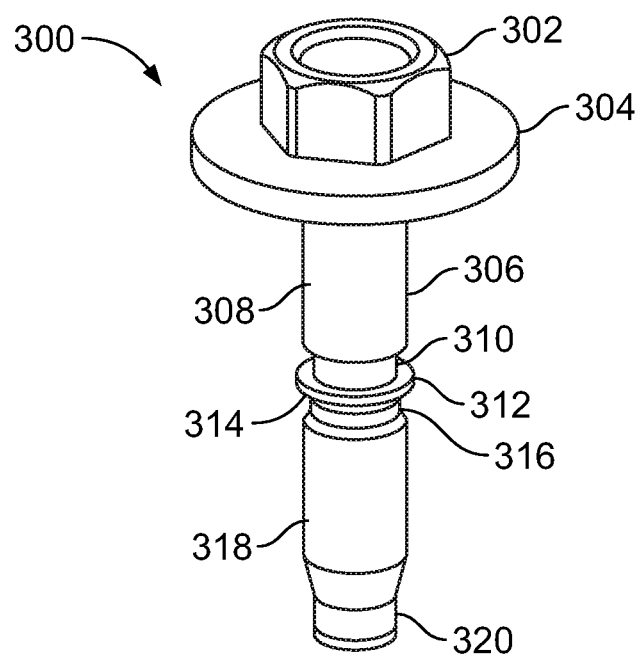
FIG. 6 illustrates a perspective view of a fastener, according to an embodiment of the present disclosure.

FIG. 6 illustrates a perspective view of a fastener 300 (such as a bolt), according to an embodiment of the present disclosure. The fastener 300 includes a head 302 having a radial collar 304 connected to a shaft 306. In at least one embodiment, the collar 304 may be a distinct component, such as a washer, that couples to the fastener 300. The shaft 306 includes a first segment 308 that extends downwardly from the head 302. An inwardly-recessed circumferential indentation 310 is formed at a lower end of the first segment 308. A radial protuberance (such as a flat ledge 312, bump, barb, ridge, rim, or the like) radially and outwardly extends below the indentation 310. A ramp 314 inwardly-cants from the ledge 312 to form another circumferential indentation 316 that connects to a second segment 318 having a distal reduced diameter tip 320.

Figure 7:
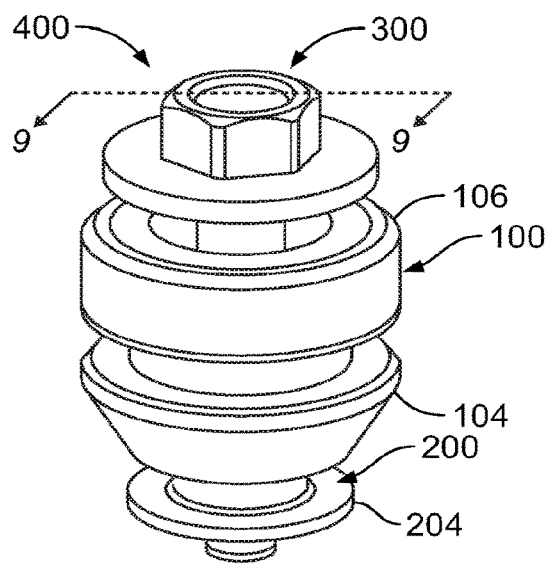
FIG. 7 illustrates a perspective first end view of a fastener assembly, according to an embodiment of the present disclosure.
Figure 8:
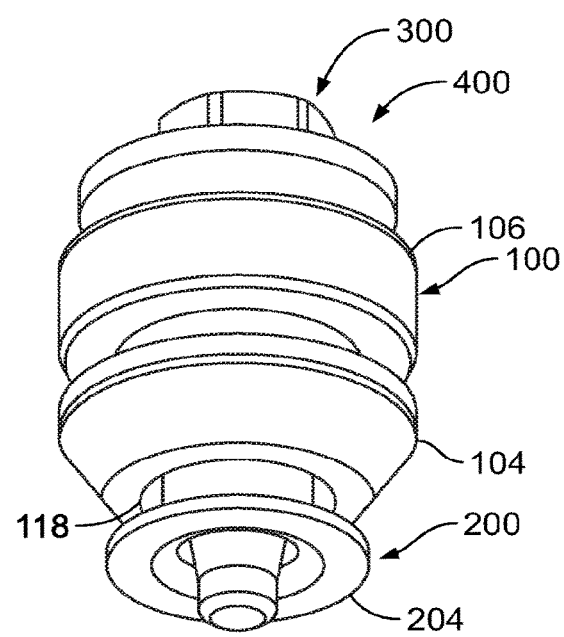
FIG. 8 illustrates a perspective second end view of a fastener assembly, according to an embodiment of the present disclosure.
Figure 9:
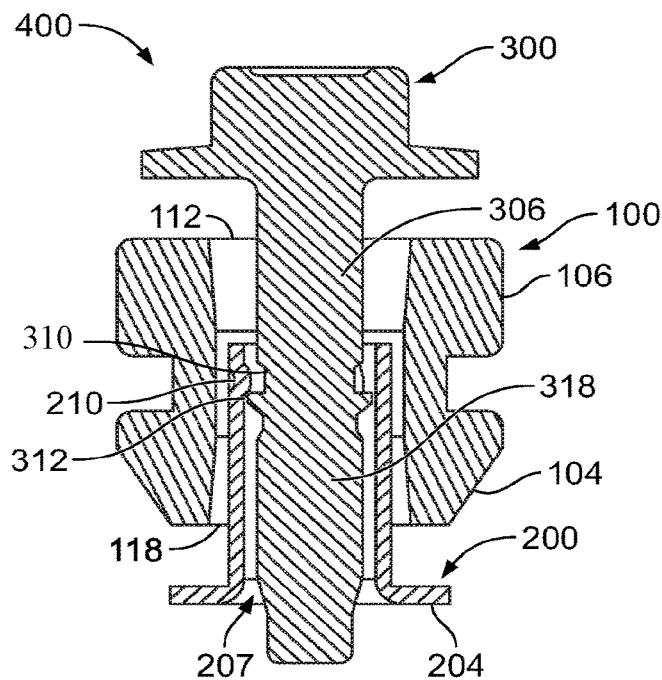
FIG. 9 illustrates an axial cross-sectional view of a fastener assembly through line 9-9 of FIG. 7, according to an embodiment of the present disclosure.

FIG. 7 illustrates a perspective first end view of a fastener assembly 400, according to an embodiment of the present disclosure. FIG. 8 illustrates a perspective second end view of the fastener assembly 400. FIG. 9 illustrates an axial cross-sectional view of the fastener assembly 400 through line 9-9 of FIG. 7. Referring to FIGS. 7-9, the fastener assembly 400 includes the grommet 100 coupled to the bushing 200, which, in turn, is coupled to the fastener 300. In order to form the fastener assembly 400, the tube 206 of the bushing 200 may first be inserted into opening 118 of the central bore 112 formed through the nose 104. The tube 206 is then urged into the central bore 112.

Next, the fastener 300 is coupled to the bushing 200, such that the second segment 318 of the shaft 306 of the fastener 300 is positioned within the central passage 207 of the bushing 200. As shown in FIG. 9, in particular, at least one protuberance 210 of the bushing 200 may extend into the indentation 310 above the ledge 312, thereby securing the bushing 200 to the fastener 300. For example, the bushing 200 may snapably secure to the fastener 300 via the interaction of the protuberance 210 and the indentation 310. In this manner, the grommet 100 is axially constrained or otherwise trapped between the collar 304 of the fastener 300, and the flange 204 of the bushing 200.

FIGS. 10 and 11 illustrate perspective top views of components 500 (such as portion of an engine cover), according to embodiments of the present disclosure. The components 500 may be formed of plastic, metal, and/or composite materials, and may include flat panels 502 having openings 504a and 504b formed therethrough. The openings 504a and 504b differ in size and/or shape. The openings 504a and 504b may have different sizes and shapes other than shown.

FIG. 12 illustrates an axial cross-sectional view of the fastener assembly 400 initially mated into an opening 504 of a component 500, according to an embodiment of the present disclosure. In order to secure the fastener assembly 400 to the component 500, the exposed tip 320 of the fastener 300 is urged into the opening 504 of the component 500 in the direction of arrow A. During this movement, the nose 104 of the grommet 100 abuts into an internal edge 506 of the panel 502 that defines the opening 504. The collar 304 then abuts into the planar surface 120 of the rim 106 of the grommet 100.

In the pre-assembled position shown in FIG. 12, an outer diameter 218 of the tube 206 of the bushing 200 is less than diameter 150 of the central bore 112 of the grommet 100. Accordingly, a clearance gap 180 is formed between the tube 206 of the bushing 200 and the grommet 100. In particular, the clearance gap 180 is defined between the outer diameter 218 of the tube 206 and the inner diameter 150 of the grommet 100 that defines the central bore 112. As such, as the fastener assembly 400 is further pushed into the opening 504 of the component 500 in the direction of arrow A, the beveled tip 108 of the nose 104 slides over the internal edge 506 and inwardly compresses in the direction of arrows B. The clearance gap 180 provides space for the nose 104 to inwardly deformed (such as by deflecting, compressing, flattening, or otherwise deforming or moving), in order to allow the nose 104 to pass through the opening 504, and the internal edge 506 to be retained within the annular channel 110 of the grommet 100. The clearance gap 180 between the grommet 100 and the bushing 200 (and the fastener 300) provides a void or other such volume of space for the grommet 100 to deform, so that the nose 104 of the grommet 100 is able to pass through the opening 504 of the component 500.

Figure 13:
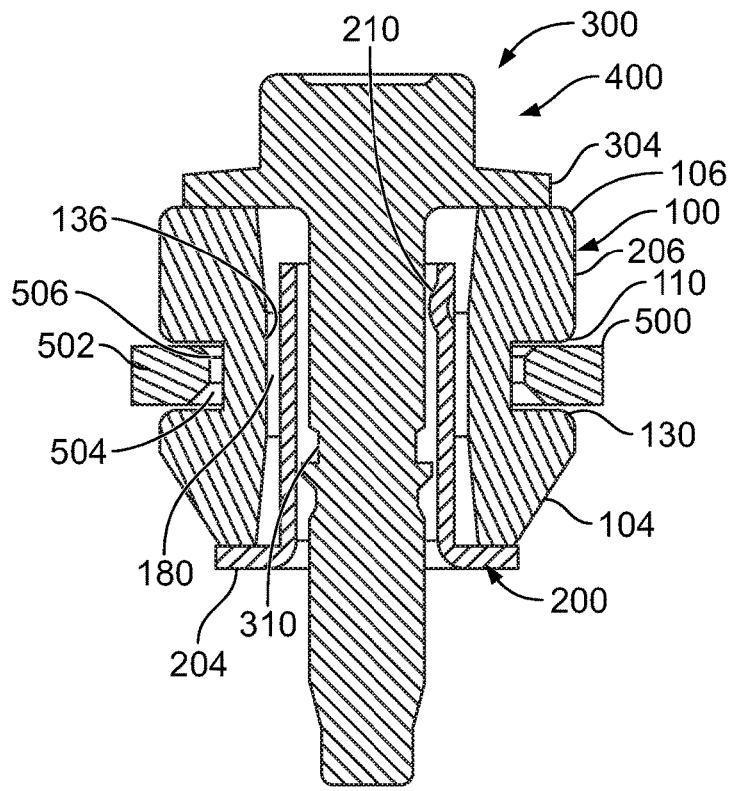
FIG. 13 illustrates an axial cross-sectional view of a fastener assembly securely coupled to a component, according to an embodiment of the present disclosure.

FIG. 13 illustrates an axial cross-sectional view of the fastener assembly 400 securely coupled to the component 500, according to an embodiment of the present disclosure. As shown in FIG. 13, the nose 104 of the grommet 100 has been pushed through the opening 504, thereby inwardly deflecting the nose 104 until the ledge 130 passes out of the opening 504, at which point the nose outwardly expands to an at-rest state, and the component 500 is trapped within the channel 110. The fastener 300 may be tightened in relation to the bushing 200, so that the rim 106 abuts against the collar 304 of the fastener 300, and the nose 104 abuts against the flange 204 of the bushing 200. During such tightening, the protuberance(s) 210 of the bushing 200 disengage from the indentation 310 of the fastener 300.

The clearance gap 180 between the grommet 100 and the bushing 200 and the fastener 300 allows for positional shifting therebetween. The positional shifting due to the clearance gap 180 allows for a wider range of tolerances between the fastener assembly 400 and the component 500. Alternatively, the inner diameter of the intermediate wall 136 of the grommet 100 may be reduced, so as to conform to an outer surface of the tube 206 of the bushing 200, such as via an interference fit. For example, the clearance gap 180 may exist between the grommet 100 and the tube 206 proximate to ends of the grommet 100, but not the intermediate wall 136.

The clearance gap 180 allows for a lower insertion force of the fastener assembly 400 into the component 500. The grommet 100 is configured to couple to different variations of a drawn metal stamping compression limiter (for example, the bushing 200) within the inner diameter of the grommet 100 so that the compression of the grommet 100 can be limited to a desired amount on each side of the component 500.

Figure 14:
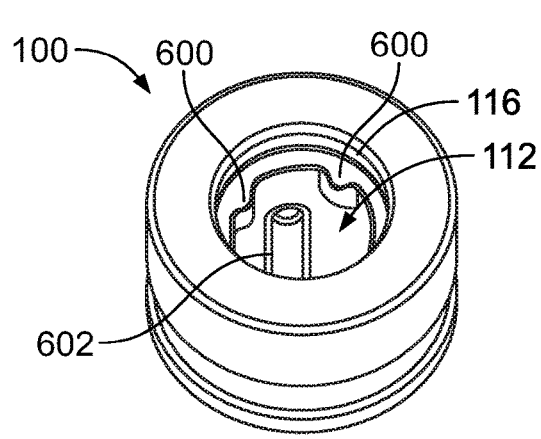
FIG. 14 illustrates a perspective first end view of a grommet, according to an embodiment of the present disclosure.
Figure 15:
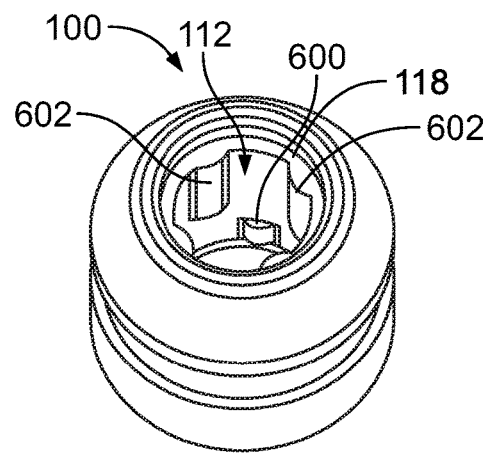
FIG. 15 illustrates a perspective second end view of a grommet, according to an embodiment of the present disclosure.
Figure 16:
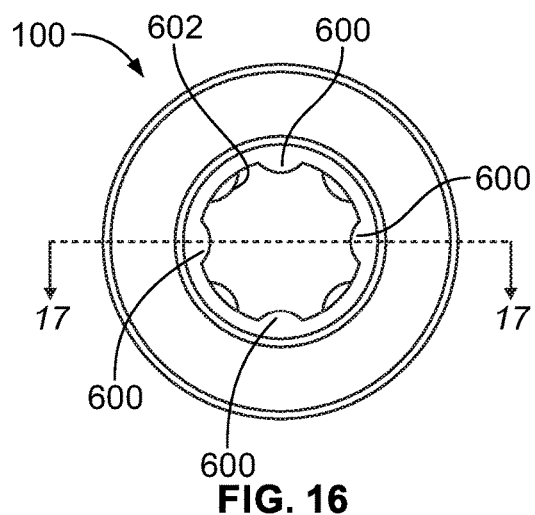
FIG. 16 illustrates a first end view of a grommet, according to an embodiment of the present disclosure.
Figure 17:
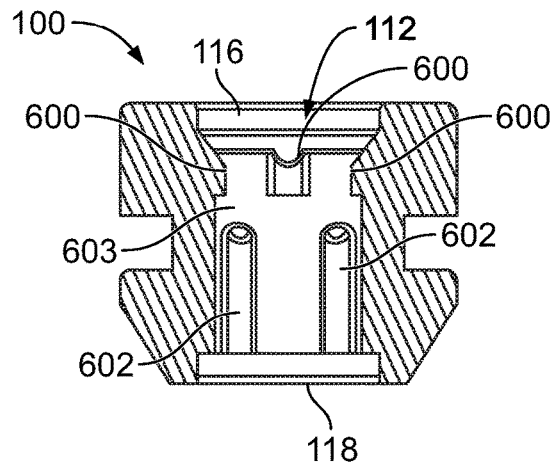
FIG. 17 illustrates an axial cross-sectional view of a grommet through line 17-17 of FIG. 16, according to an embodiment of the present disclosure.

FIG. 14 illustrates a perspective first end view of a grommet 100, according to an embodiment of the present disclosure. FIG. 15 illustrates a perspective second end view of the grommet 100. FIG. 16 illustrates a first end view of the grommet 100. FIG. 17 illustrates an axial cross-sectional view of the grommet 100 through line 17-17 of FIG. 16. Referring to FIGS. 14-17, the grommet 100 is similar to the grommet shown and described with respect to FIGS. 1-4. The grommet 100 may include a plurality of spaced apart first protuberances 600 extending into the central bore 112 proximate to the first opening 116. The first protuberances 600 may be inwardly-directed ribs, studs, bumps, nubs, and/or the like. Additionally, a plurality of second protuberances 602, such as columns, ribs, studs, bumps, nubs, or the like, extend into the central bore 112 proximate to the second opening 118. As shown, the first protuberances 600 may be radially shifted relative to the second protuberances 602. The first and second protuberances 600 and 602 may be used with any of the embodiments of the present disclosure.

An annular space 603 is formed between ends of the protuberances 600 and 602. A retaining foot of the bushing 200 (shown in FIG. 18) may be securely retained between the protuberances 600 and 602 in the radial space in a pre-assembled position.

Figure 18:
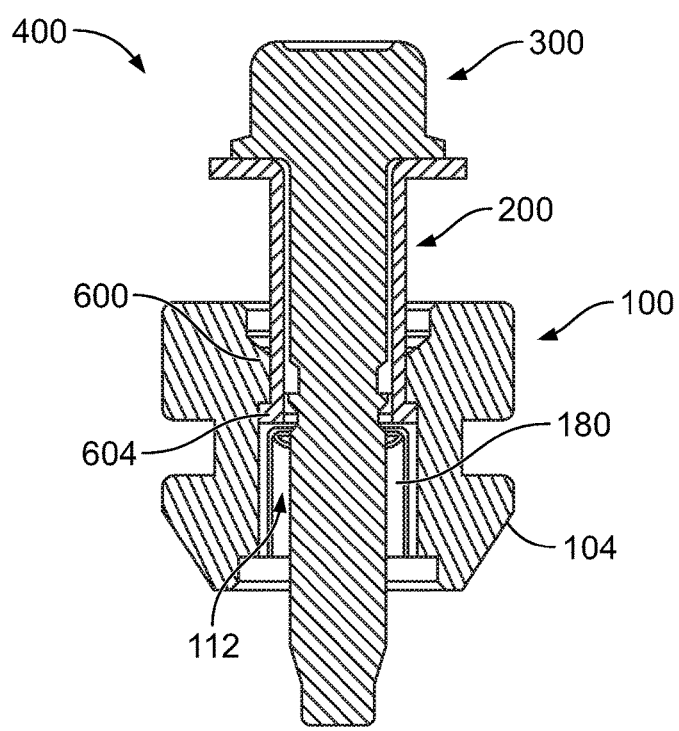
FIG. 18 illustrates an axial cross-sectional view of a fastener assembly, according to an embodiment of the present disclosure.

FIG. 18 illustrates an axial cross-sectional view of a fastener assembly 400, according to an embodiment of the present disclosure. The fastener assembly 400 includes the grommet 100 shown and described with respect to FIGS. 14-17.

Figure 20:
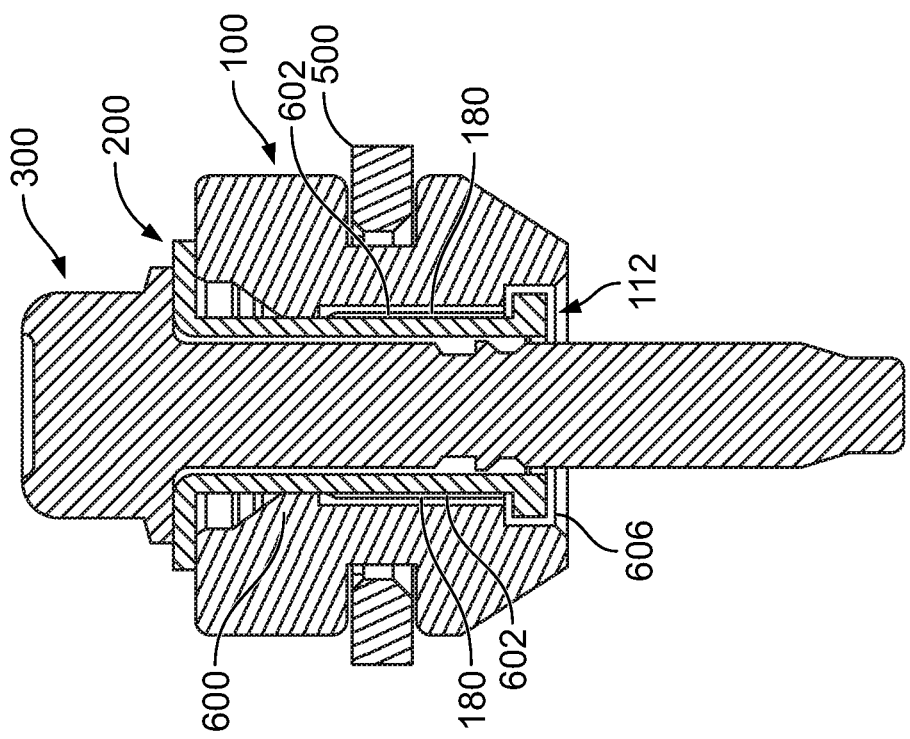
FIG. 20 illustrates an axial cross-sectional view of a fastener assembly securely coupled to a component, according to an embodiment of the present disclosure.
Figure 19:
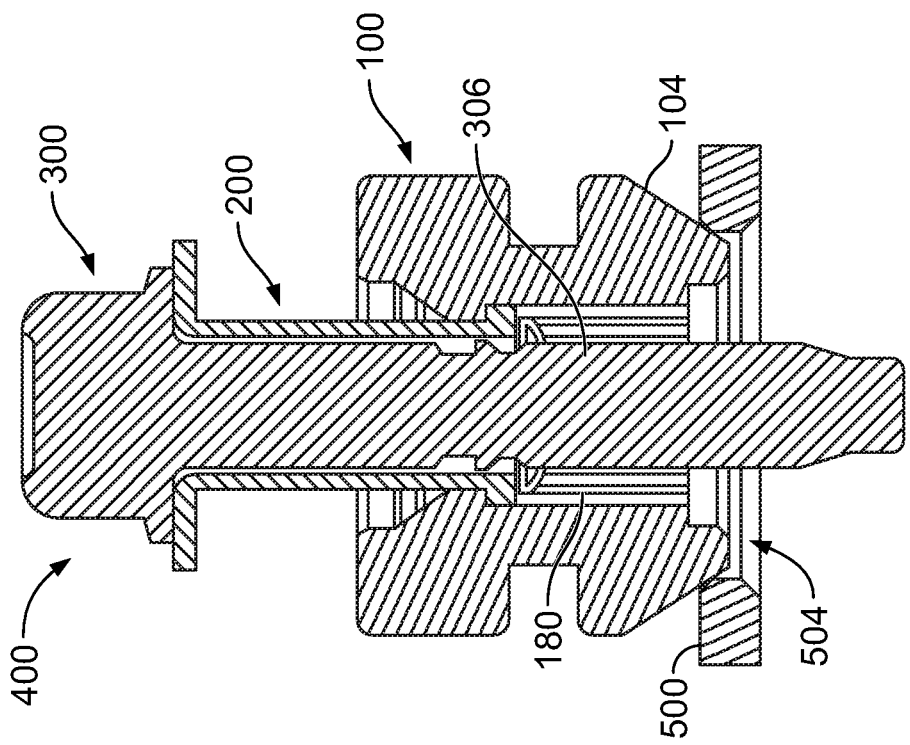
FIG. 19 illustrates an axial cross-sectional view of a fastener assembly initially mated into an opening of a component, according to an embodiment of the present disclosure.

FIG. 19 illustrates an axial cross-sectional view of the fastener assembly 400 initially mated into an opening 504 of a component 500, according to an embodiment of the present disclosure. FIG. 20 illustrates an axial cross-sectional view of the fastener assembly 400 securely coupled to the component 500. Referring to FIGS. 18-20, the fastener 300 and the bushing 200 may be coupled together, such as through a snap fit, as described above.

Next, the sub-assembly formed by the fastener 300 and the bushing 200 may be partially inserted into the grommet 100. The grommet 100 secures to the bushing 200 by a press fit or by a retention foot 604 on the bushing resting in a void in the central bore 112 of the grommet 100 underneath the first protuberances 600, providing the pre-assembled position or state (for example, an "as-shipped" condition), as shown in FIG. 18. The first and/or second protuberances 600, 602 may abut into an outer surface of the tube 206 of the bushing 200 when the retention foot 604 is retained between the protuberances 600 and 602 within the space 603, thereby securely coupling the grommet 100 to the bushing 200 (and therefore the fastener 300) in the pre-assembled state.

The pre-assembled fastener assembly 400, as shown in FIG. 18, is pressed into the opening 504 of the component 500, as shown in FIG. 19, by applying a press force to the top of the grommet 100. Due to the bushing 200 being in a partially inserted position as shown in FIG. 19, a substantial clearance gap 180 is defined between the shaft 306 of the fastener 300 and the grommet 100, thereby providing an increased deflection range of motion for the grommet 100 as the grommet is pushed into the opening 504 of the component 500 into the fully-secured position shown in FIG. 20. The clearance gap 180 provides a relief void that allows the nose 104 of the grommet 100 to inwardly deform and deflect. Once the grommet 100 is secured to the component 500 as shown in FIG. 20, the bushing 200 is completely pressed into the grommet 100, and may also be retained by the first protuberances 600 and the second protuberances 602 coupling to the tube 206. As shown, the retention foot 604 may be secured within an expanded notched end 606 of the central bore 112.

Figure 21:
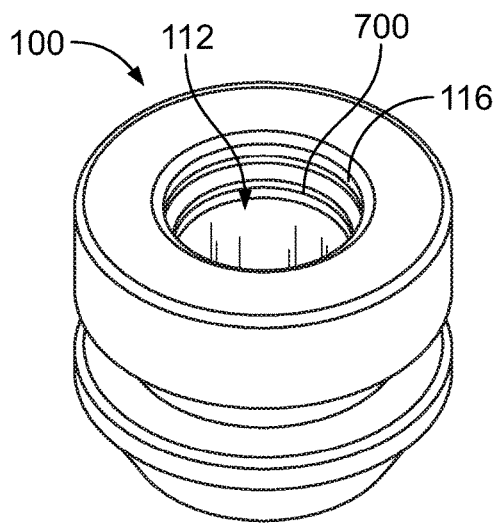
FIG. 21 illustrates a perspective first end view of a grommet, according to an embodiment of the present disclosure.
Figure 22:
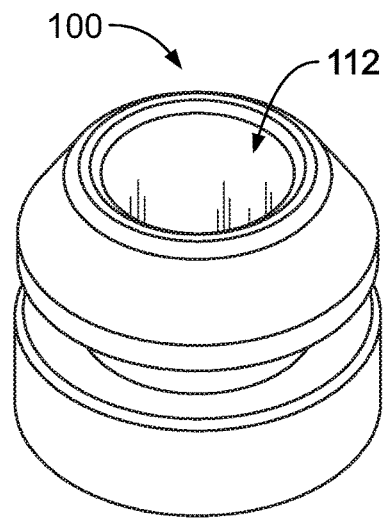
FIG. 22 illustrates a perspective second end view of a grommet, according to an embodiment of the present disclosure.
Figure 23:
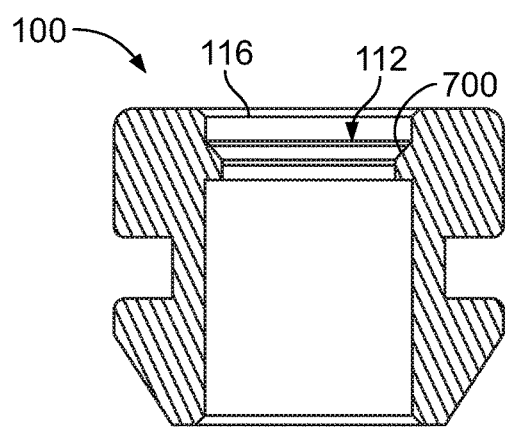
FIG. 23 illustrates an axial cross-sectional view of a grommet, according to an embodiment of the present disclosure.

FIG. 21 illustrates a perspective first end view of a grommet 100, according to an embodiment of the present disclosure. FIG. 22 illustrates a perspective second end view of the grommet 100. FIG. 23 illustrates an axial cross-sectional view of the grommet 100. Referring to FIGS. 21-23, the grommet 100 is similar to those described above. As shown in FIGS. 21-23, the grommet 100 may include a protuberance, such as an inwardly-directed ridge 700 that extends into the central bore 112 proximate to the opening 116. The ridge 700 may be used with any of the embodiments of the present disclosure.

Figure 24:
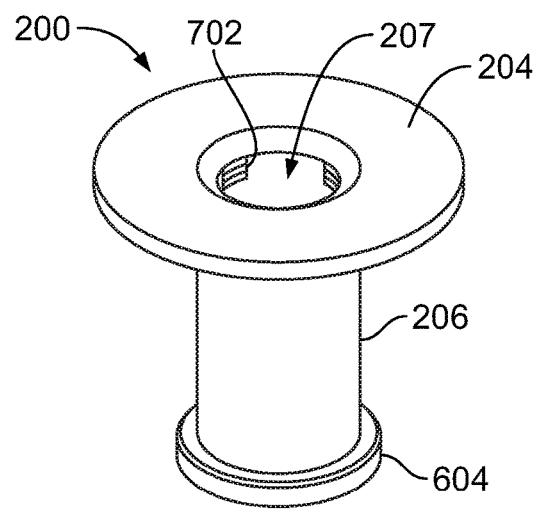
FIG. 24 illustrates a perspective view of a bushing, according to an embodiment of the present disclosure.

FIG. 24 illustrates a perspective view of a bushing 200, according to an embodiment of the present disclosure. The bushing 20 is similar to the bushings shown and described with respect to FIGS. 6 and 18. The bushing 200 may include the retaining foot 604 opposite from the flange 204. A plurality of protuberances 702 (such as bumps, tabs, nubs, studs, and/or the like) may inwardly extend into the central passage 207 from inner surfaces of the tube 206. The protuberances 702 may be used with the bushings of any of the embodiments of the present disclosure.

Figure 26:
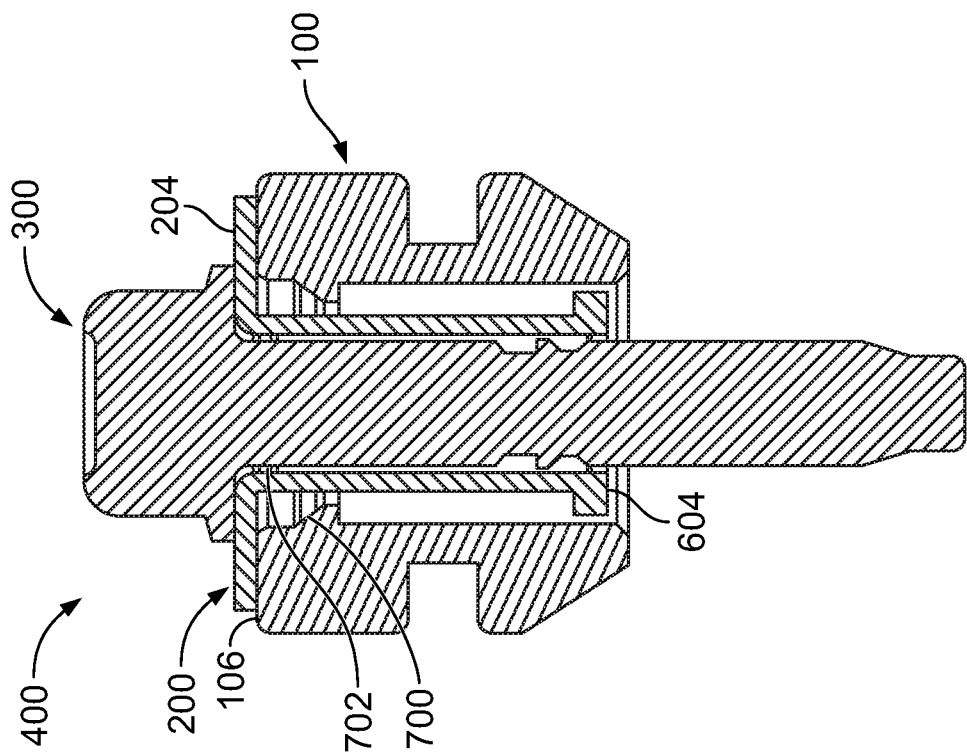
FIG. 26 illustrates an axial cross-sectional view of a fastener assembly, according to an embodiment of the present disclosure.
Figure 25:
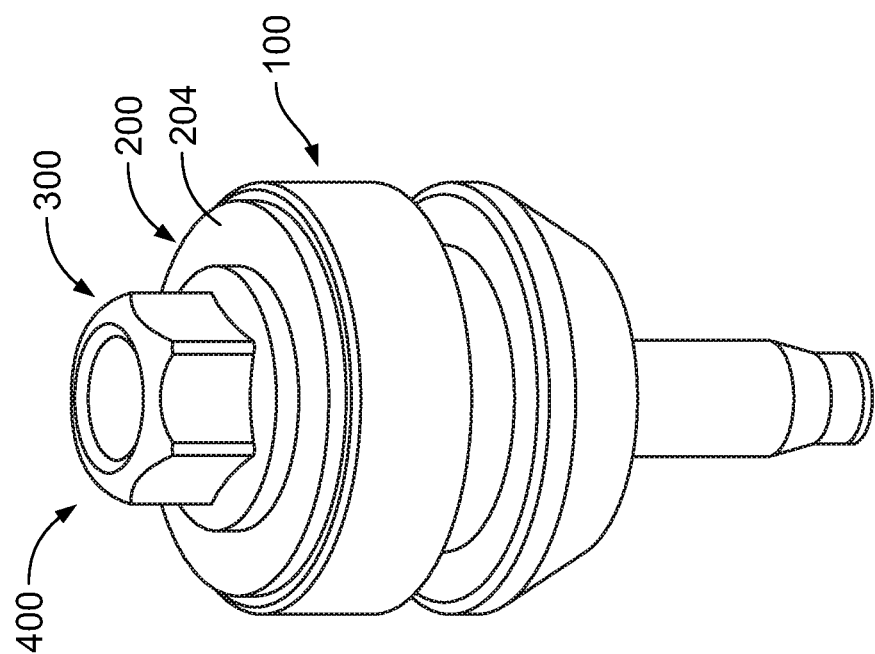
FIG. 25 illustrates a perspective view of a fastener assembly, according to an embodiment of the present disclosure.
Figure 28:
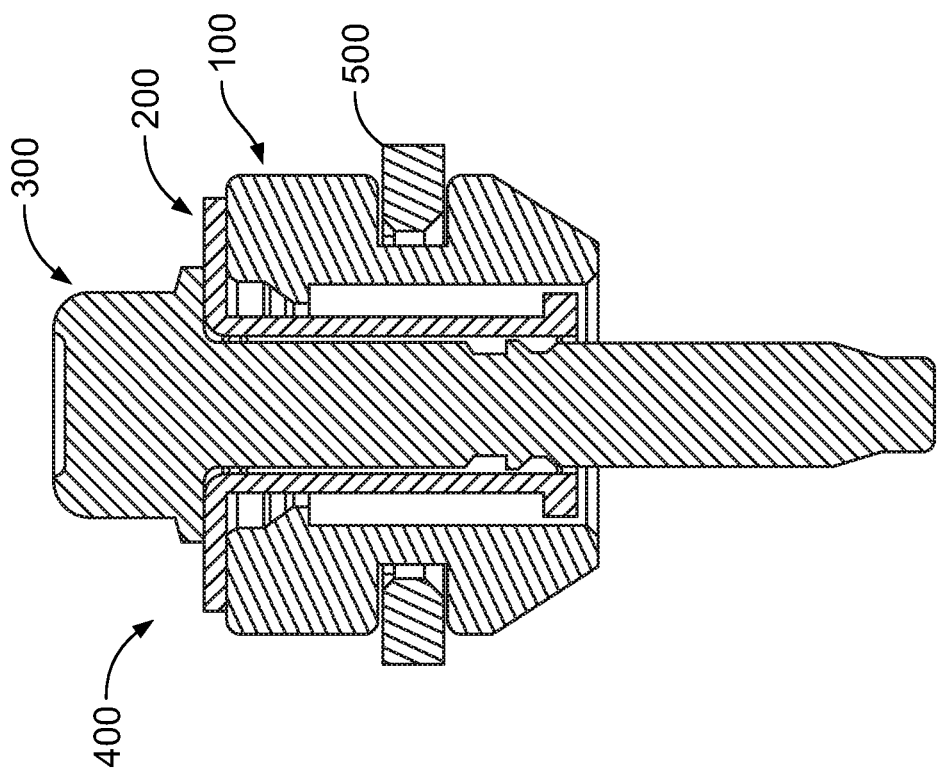
FIG. 28 illustrates an axial cross-sectional view of a fastener assembly securely coupled to a component, according to an embodiment of the present disclosure.
Figure 27:
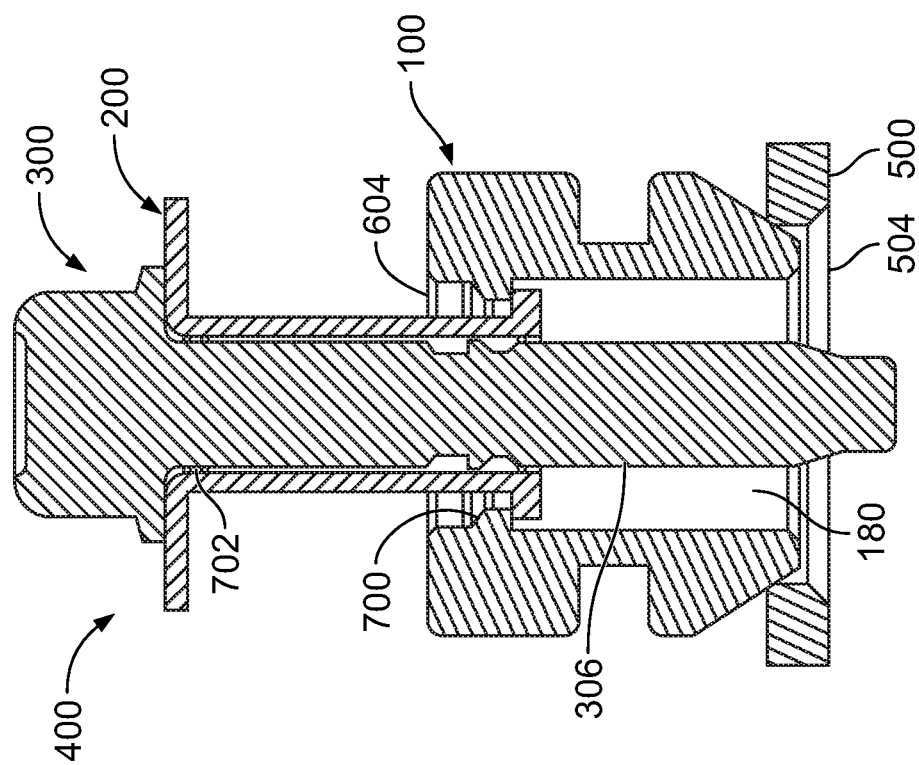
FIG. 27 illustrates an axial cross-sectional view of a fastener assembly initially mated into an opening of a component, according to an embodiment of the present disclosure.

FIG. 25 illustrates a perspective view of a fastener assembly 400, according to an embodiment of the present disclosure. FIG. 26 illustrates an axial cross-sectional view of the fastener assembly 400. FIG. 27 illustrates an axial cross-sectional view of the fastener assembly 400 initially mated into an opening 504 of a component 500, according to an embodiment of the present disclosure. FIG. 28 illustrates an axial cross-sectional view of the fastener assembly 400 securely coupled to the component 500. Referring to FIGS. 25-28, like the embodiment described with respect to FIGS. 14-20, the retaining foot 604 may latch onto the ridge 702 (as shown in FIG. 27) to prevent the bushing 200 and the fastener 300 from dislodging from the grommet, while at the same time providing an increased clearance gap 180 between the grommet 100 and the shaft 306 of the fastener 300 that allows for an increased range of inward movement of the grommet 100 as the nose 104 is urged into the opening 504.

Figure 29:
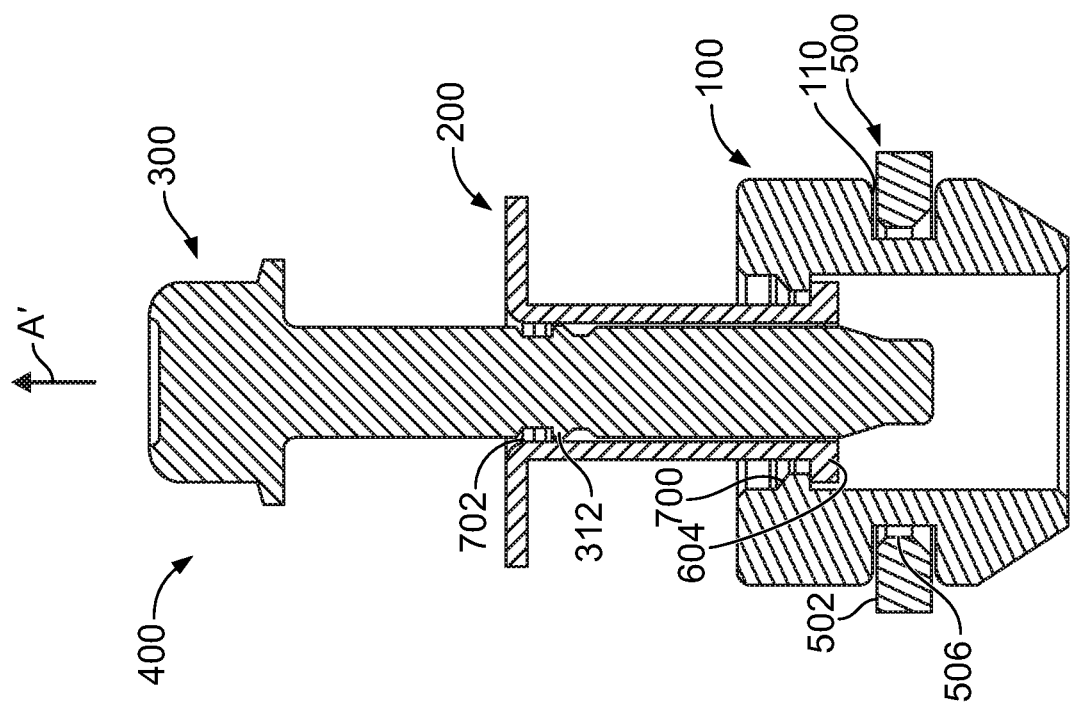
FIG. 29 illustrates an axial cross-sectional view of a fastener being retracted from a bushing of a fastener assembly, according to an embodiment of the present disclosure.

FIG. 29 illustrates an axial cross-sectional view of the fastener 300 being retracted from the bushing 200 of the fastener assembly 400, according to an embodiment of the present disclosure. As shown, the grommet 100 is secured to the component 500, such that the edge 506 of the panel 502 is trapped within the annular channel 110 of the grommet 100.

As the fastener 300 is retracted (for example, upwardly urged) in the direction of arrow A', the retaining foot 604 abuts into the ridge 700 of the grommet 100. The ridge 700 blocks further motion of the bushing 200 in the direction of arrow A', due to the retaining foot 604 abutting into the ridge 700. If the fastener 300 pulled out of the bushing 200 in the direction of arrow A', the protuberance(s) 702 abut into the ledge 312 of the fastener 300, thereby ensuring that the fastener 300 remains coupled to the bushing 200.

In the embodiment shown in FIGS. 21-29, the grommet 100 is free to move vertically in relation to the bushing 200 after the bushing 200 is snapped past the ridge 700. The range of vertical motion is limited by the abutting interaction of the flange 204 of the bushing 200 and the rim 106 of the grommet 100 and the abutting interaction of the retaining foot 604 and the ridge 700. The ridge 700 may be a ring as shown, segmented ribs/nibs, and/or the like in the central bore 112. The allowed relative motion between the grommet 100, the bushing 200, and the fastener 300 allows for additional retraction of the assembly 400, as shown in FIG. 29, in particular.

Figure 30:
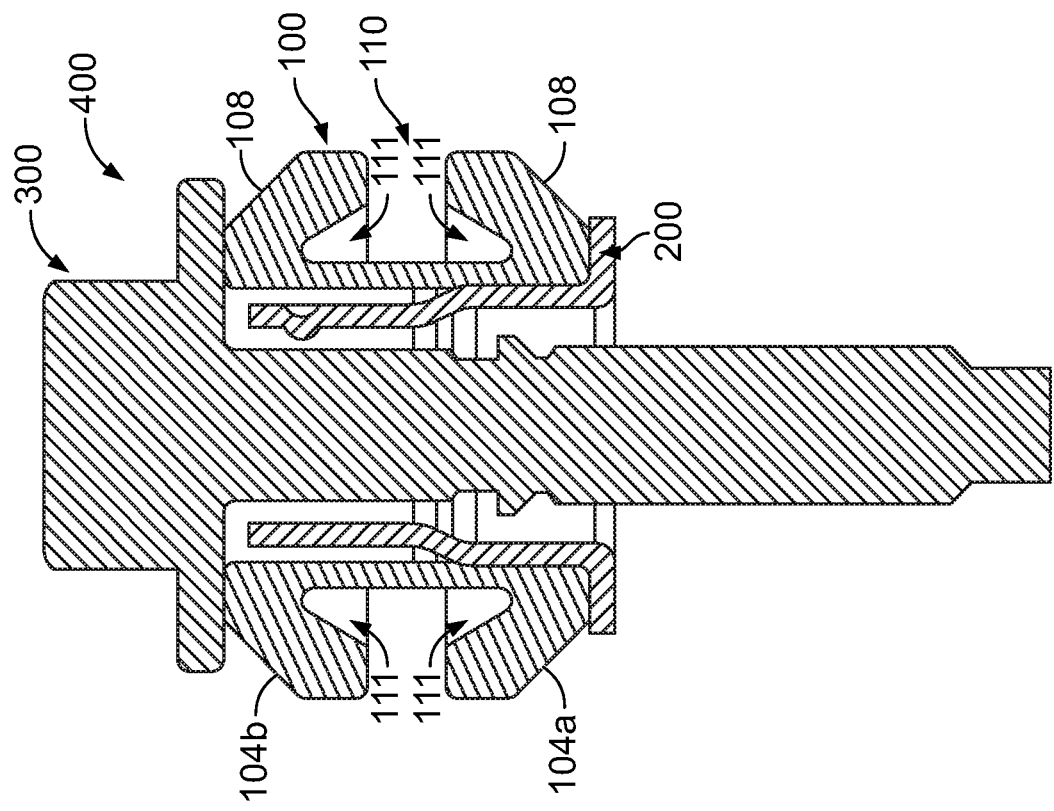
FIG. 30 illustrates an axial cross-sectional view of a fastener assembly, according to an embodiment of the present disclosure.

FIG. 30 illustrates an axial cross-sectional view of a fastener assembly 400, according to an embodiment of the present disclosure. In this embodiment, the grommet 100 may include opposed noses 104a and 104b, each having a beveled tip 108. Further, the annular channel 110 may include recessed spaces 111 that extend into the noses 104a and 104b. The grommet 100 shown in FIG. 30 allows for easy insertion into a component. For example, the beveled tips 108 of the opposed noses 104a and 104b provide lead-in features that allow for the grommet 100 to be inserted into a component from either end. Moreover, the recessed spaces 111 provide increased flexibility that allows easier deflection of the noses 104a and 104b as they are inserted into a hole of a component.

Referring to FIGS. 1-30, embodiments of the present disclosure provide fastener assemblies that include a grommet that is easily, safely, and securely coupled to a component. Further, embodiments of the present disclosure provide a simple process of securing a grommet to a component that is not susceptible to damaging the grommet or the component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener assembly that is configured to securely couple to a component, the fastener assembly comprising:
   a compression-limiting bushing having a flange, a tube extending from the flange, and a central passage formed through the flange and the tube, wherein at least one nub extends from the tube into the central passage, and wherein the at least one nub is spaced from an end of the tube and spaced from the flange;
a fastener coupled to the bushing, wherein the fastener is configured to be retained within the central passage at least partially by the at least one nub; and
a grommet coupled to the bushing, wherein a clearance gap is defined between one or both of the bushing or the fastener and the grommet, wherein at least a portion of the grommet is configured to move into the clearance gap as the fastener assembly is urged into an opening of the component, and wherein the grommet is configured to securely couple to the component.

2. The fastener assembly of claim 1, wherein the grommet comprises at least one nose, wherein the at least one nose comprises a beveled tip, and wherein the at least a portion of the grommet includes the nose.

3. The fastener assembly of claim 2, wherein the grommet further comprises:
a rim connected to the nose;
an intermediate channel between the nose and the rim, wherein the intermediate channel is configured to securely retain an edge of the component that defines an opening into which the fastener assembly is configured to be disposed; and
a central bore that passes through the nose, the rim, and the intermediate channel, wherein at least a portion of the bushing and at least a portion of the fastener are retained within the central bore.

4. The fastener assembly of claim 2, wherein the at least one nose comprises a first nose connected to a second nose, wherein the first and second noses comprise recessed spaces.

5. The fastener assembly of claim 1, wherein each nub is located nearer to the end of the tube than to the flange.

6. The fastener assembly of claim 1, wherein the flange of the bushing defines an outer diameter that is less than an outer diameter of the grommet and greater than an outer diameter of the fastener.

7. The fastener assembly of claim 1, wherein the fastener comprises:
a head having a radial collar;
and a shaft connected to the head, wherein the shaft includes:
a first segment extending from the head;
an inwardly-recessed circumferential indentation formed at an end of the first segment;
the a radial protuberance radially and outwardly extending proximate to the indentation;
a ramp inwardly canting from the radial protuberance; and
a second segment having a distal tip.

8. The fastener assembly of claim 1, wherein the tube of the bushing is configured to be inserted and urged into a central bore formed through the grommet, and wherein the fastener is configured to be coupled to the bushing after the bushing is coupled to the grommet.

9. The fastener assembly of claim 1, wherein the grommet is axially constrained between a collar of the fastener and the flange of the bushing.

10. The fastener assembly of claim 1, wherein an outer diameter of a tube that fits within a central bore of the grommet is less than a diameter of the central bore, wherein the clearance gap is defined between an inner wall of the grommet that defines the central bore and an outer surface of the tube.

11. The fastener assembly of claim 10, wherein the grommet comprises at least one protuberance extending into the central bore, wherein the at least one protuberance is configured to interact with at least a portion of the bushing to limit relative motion between the bushing and the grommet.

12. The fastener assembly of claim 11, wherein the at least one protuberance comprises a plurality of first protuberances and a plurality of second protuberances separated by an annular space, wherein a retention foot of the bushing is configured to be retained within the annular space between the plurality of first protuberances and the plurality of second protuberances in a pre-assembled position.

13. The fastener assembly of claim 11, wherein the at least one protuberance comprises at least one inwardly-directed ridge.

14. A fastener assembly that is configured to securely couple to a component, the fastener assembly comprising:
a compression-limiting bushing, wherein the bushing comprises:
a flange defining a peripheral edge of the bushing;
a tube extending from the flange to a distal end opposite the flange; and
a central passage formed through the flange and the tube, wherein at least one nub extends from the tube into the central passage, wherein the at least one nub is spaced from the distal end and spaced from the flange; a fastener coupled to the bushing,
wherein the fastener comprises:
a head having a radial collar; and
a shaft connected to the head, wherein the shaft includes: a first segment extending from the head, an inwardly-recessed circumferential indentation formed at an end of the first segment, a radial protuberance radially and outwardly extending proximate to the indentation, a ramp inwardly canting from the radial protuberance, and a second segment having a distal tip, wherein the shaft of the fastener is retained within the central passage; and
a grommet coupled to the bushing, wherein the grommet comprises:
a nose having a beveled tip;
a rim connected to the nose;
an intermediate channel between the nose and the rim, wherein the intermediate channel is configured to securely retain an edge of the component that defines an opening into which the fastener assembly is configured to be disposed; and
a central bore that passes through the nose, the rim, and the intermediate channel, wherein at least a portion of the bushing and at least a portion of the fastener are retained within the central bore,
wherein a clearance gap is defined between one or both of the bushing or the fastener and the grommet, wherein the nose of the grommet is configured to move into the clearance gap as the fastener assembly is urged into an opening of the component, and wherein the grommet is configured to securely couple to the component.

15. The fastener assembly of claim 14, wherein the grommet is configured to be positioned between the flange of the bushing and the head of the fastener.

16. The fastener assembly of claim 14, wherein the tube of the bushing is configured to be inserted and urged into the central bore formed through the grommet, and wherein the fastener is configured to be coupled to the bushing after the bushing is coupled to the grommet.

17. The fastener assembly of claim 14, wherein an outer diameter of the tube that fits within the central bore of the grommet is less than a diameter of the central bore, wherein the clearance gap is defined between an inner wall of the grommet that defines the central bore and an outer surface of the tube.

18. The fastener assembly of claim 14, wherein the grommet comprises at least one protuberance extending into the central bore, wherein the at least one protuberance is configured to interact with at least a portion of the bushing to limit relative motion between the bushing and the grommet.

19. A fastener assembly, comprising:
a bushing including a tube that extends from a flange, the tube defining a distal end opposite the flange and a plurality of nubs spaced radially along the tube;
a grommet including a central bore formed therethrough, the grommet having an intermediate channel defined between a rim and a nose; and
a fastener including a head and shaft extending from the head, the shaft including an indentation extending circumferentially about the shaft, wherein the bushing is configured to be inserted and urged into a central bore formed through the grommet,
wherein the fastener is configured to be coupled to the plurality of nubs of the bushing,
wherein the fastener, the grommet, and the bushing are configured to be coupled together before being coupled within an opening in a panel by an axial force applied to the head of the fastener, and
wherein the grommet is positioned between the head of the fastener and the flange of the tube.

\* \* \* \* \*